(12) United States Patent
Kato (10) Patent No.: US 7,623,243 B2
(45) Date of Patent: Nov. 24, 2009

(54) SPECTROSCOPIC DEVICE

(75) Inventor: Hisaki Kato, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 398 days.

(21) Appl. No.: 10/572,369

(22) PCT Filed: Sep. 13, 2004

(86) PCT No.: PCT/JP2004/013322

§ 371 (c)(1),
(2), (4) Date: Dec. 20, 2006

(87) PCT Pub. No.: WO2005/029018

PCT Pub. Date: Mar. 31, 2005

(65) Prior Publication Data

US 2007/0121112 A1    May 31, 2007

(30) Foreign Application Priority Data

Sep. 17, 2003    (JP) ............................. 2003-324978

(51) Int. Cl.
*G01N 21/25* (2006.01)
(52) U.S. Cl. .................. 356/419; 356/416; 359/634
(58) Field of Classification Search ......... 356/413–419, 356/319, 320, 326, 213, 220–227; 359/634, 359/856, 857

See application file for complete search history.

(56) References Cited

U.S. PATENT DOCUMENTS

| | | | | |
|---|---|---|---|---|
| 5,600,487 A | * | 2/1997 | Kiyomoto et al. | 359/634 |
| 5,760,900 A | * | 6/1998 | Ito et al. | 356/338 |
| 6,252,719 B1 | * | 6/2001 | Eichenbaum | 359/634 |
| 6,362,888 B1 | | 3/2002 | Jung et al. | 356/419 |
| 6,683,314 B2 | | 1/2004 | Oostman, Jr. et al. | 250/461.2 |
| 2004/0070765 A1 | | 4/2004 | Yamauchi | 356/451 |

FOREIGN PATENT DOCUMENTS

| | | |
|---|---|---|
| EP | 1 602 902 | 12/2005 |
| JP | 61-198203 | 9/1986 |

(Continued)

*Primary Examiner*—L. G Lauchman
(74) *Attorney, Agent, or Firm*—Drinker Biddle & Reath LLP (57) ABSTRACT

A spectroscopic device that can suppress the occurrence of cross-talk when light beams of different wavelength ranges are optically received is provided. Detected light is made incident to a dichroic minor (hereinafter referred to as "mirror") $DM_1$ along the perpendicular direction of a photoelectric surface 7. Accordingly, light transmitted through the mirror $DM_1$ is made incident substantially perpendicular to the photoelectric surface 7. On the other hand, light reflected from the mirror $DM_1$ is reflected from a main mirror surface 23. At this time, the dichroic mirror array 21 is inclined so that the mirror $DM_8$ side having the minimum shortest wavelength is nearer to the photoelectric surface 7 than the minor $DM_1$ side having the maximum shortest wavelength and substantially parallel to the main minor surface 23$a$, so that light reflected from the main mirror surface 23$a$ is made incident to the mirror $DM_2$ along the perpendicular direction of the photoelectric surface 7. Accordingly, light transmitted through the mirror $DM_2$ is made incident substantially perpendicular tote photoelectric surface 7. As described above, the light transmitted through each mirror $DM_n$ is substantially vertical made incident to the photoelectric surface 7, and thus the occurrence of cross-talk can be suppressed.

6 Claims, 8 Drawing Sheets

FOREIGN PATENT DOCUMENTS

| | | |
|---|---|---|
| JP | 9-173324 | 7/1997 |
| JP | 10-62246 | 3/1998 |
| JP | 10-78353 | 3/1998 |
| JP | 2000-146860 | 5/2000 |
| WO | 01/46659 | 6/2001 |
| WO | 03/016842 | 2/2003 |
| WO | 2004/076997 | 9/2004 |

* cited by examiner

SPECTROSCOPIC DEVICE

TECHNICAL FIELD

The present invention relates to a spectroscopic device for spectroscopically separating detected light into light of different wavelength ranges and detecting light of each wavelength range by a photodetector.

BACKGROUND ART

The following Patent Document 1 discloses an example of this type of conventional spectroscopic device. In this spectroscopic device, a plurality of dichroic mirrors which are different in rising wavelength of reflectivity are arranged in increasing or decreasing order of the wavelength to thereby construct a dichroic mirror array. A planar mirror is disposed at the light reflection side of the dichroic mirror array so as to oppose the dichroic mirror array. Furthermore, a light-receiving element array having a plurality of light-receiving elements arranged along the arrangement direction of the dichroic mirrors is disposed at the light transmission side of the dichroic mirror array.

When collimated light is obliquely made incident from the planar mirror side to a dichroic mirror located at one end in the thus constructed spectroscopic device, light having wavelengths longer than the rising wavelength of the reflectivity of the dichroic mirror is reflected from the diachronic mirror, and light having wavelengths shorter than the rising wavelength is transmitted through the diachronic mirror. The reflected light is reflected from the planar mirror and made incident to the adjacent dichroic mirror. Subsequently, the light reflection and transmission is repeated until the light reaches the dichroic mirror located at the other end. As described above, light beams having different wavelength ranges are, respectively, transmitted through the respective dichroic mirrors, so that the collimated light is spectroscopically separated. The light transmitted through each dichroic mirror is optically received by the light-receiving elements arranged along the arrangement direction of the dichroic mirrors.

Patent Document 1: Japanese Published Unexamined Patent Application No. H10-62246

DISCLOSURE OF THE INVENTION

Problems to be Solved by the Invention

However, in the spectroscopic device described above, light transmitted through each dichroic mirror is obliquely made incident to the light-receiving face of each light-receiving element, and thus there is a risk that cross-talk occurs between adjacent light-receiving elements.

Therefore, the present invention has been implemented under such circumstances, and has an object to provide a spectroscopic device that can suppress the occurrence of cross-talk when light beams having different wavelength ranges are detected.

Means for Solving the Problem

In order to attain the above object, a spectroscopic device according to the present invention for spectroscopically separating detected light into light beams having different wavelength ranges and optically receiving light of each wavelength range by a light-receiving face of a photodetector is characterized by including a dichroic mirror array having a plurality of dichroic mirrors in which the long wavelength range sides thereof are light transmissible ranges and the shortest wavelengths of the light transmissible ranges are different from each other, and that are arranged along an oblique direction of a plane opposing a light-receiving face at a predetermined inclination angle to the light-receiving face in a decreasing order of the shortest wavelength so as to be substantially parallel to the plane, and a reflection member that is disposed at the light reflection side of the dichroic mirror array and equipped with a reflection face opposing the dichroic mirrors substantially parallel to the dichroic mirrors, wherein the plane is inclined so that the dichroic mirror side having the minimum shortest wavelength is nearer to the light-receiving face than the dichroic mirror side having the maximum shortest wavelength, the detected light is made incident to the dichroic mirror having the maximum shortest wavelength along the perpendicular direction of the light-receiving face.

In this spectroscopic device, the detected light is made incident along the perpendicular direction of the light-receiving face of the photodetector to the dichroic mirror having the maximum shortest wavelength of the light transmissible range, and thus the light transmitted through the dichroic mirror is made incident substantially perpendicular to the light-receiving face. On the other hand the light reflected from the dichroic mirror is reflected by the reflection face of the reflecting member disposed at the light reflection side of the dichroic mirror array. At this time, each dichroic mirror is disposed substantially parallel to the plane that is inclined so that the dichroic mirror side having the minimum shortest wavelength is nearer to the light-receiving face than the dichroic mirror side having the maximum shortest wavelength, and it opposes the reflection face of the reflecting member substantially parallel to the reflection face. Therefore, the light reflected from the reflection face is made incident to a dichroic mirror having the second maximum shortest wavelength of the light transmissible range along the perpendicular direction of the light-receiving face. Therefore, the light transmitted through the dichroic mirror having the second maximum shortest wavelength is also made incident substantially perpendicular to the light-receiving face. As described above, the light reflection and transmission is repeated until the light having the shortest wavelength of the light transmissible range reaches the minimum dichroic mirror, and all the light beams transmitted through the respective dichroic mirrors (the light beams different in wavelength range) are made incident substantially perpendicular to the light-receiving face of the photodetector. Accordingly, occurrence of cross-talk in the photodetector can be suppressed when the light beams having different wavelength ranges are optically received.

Also, the spectroscopic device according to the present invention for spectroscopically separating detected light into light beams having different wavelength ranges and optically receiving light of each wavelength range by a light-receiving face of a photodetector, is characterized by including a dichroic mirror array having a plurality of dichroic mirrors in which the short wavelength range sides thereof are light transmissible ranges and the longest wavelengths of the light transmissible ranges are different from each other, and that are arranged along an oblique direction of a plane opposing a light-receiving face at a predetermined inclination angle to the light-receiving face in an increasing order of the longest wavelength so as to be substantially parallel to the plane and a reflection member that is disposed at the light reflection side of the dichroic mirror array and equipped with a reflection face opposing the dichroic mirrors substantially parallel to the dichroic mirrors, wherein the plane is inclined so that the dichroic mirror side having the maximum longest wavelength is nearer to the light-receiving face than the dichroic mirror side having the minimum longest wavelength, the detected light is made incident to the dichroic mirror having the minimum longest wavelength along the perpendicular direction of the light-receiving face.

This spectroscopic device is different from the spectroscopic device using the dichroic mirrors whose long wavelength range side is a light transmissible range in that the spectroscopic device uses dichroic mirrors whose short wavelength range side is a light transmissible range. Accordingly, in the spectroscopic device, a plurality of dichroic mirrors which are different in the longest wavelength of the light transmissible range from one another are arranged in an increasing order of the longest wavelength, whereby the occurrence of cross-talk in the photodetector can be suppressed when light beams of different wavelength ranges are optically received as in the case of the above-described spectroscopic device.

It is preferable that a band pass filter is disposed at the position corresponding to each of the dichroic mirrors in the perpendicular direction of the photoelectric surface between the photoelectric surface and the dichroic mirror array. Accordingly, the light transmitted through each dichroic mirror is also transmitted through the band pass filter, and thus wavelength discrimination can be enhanced. Accordingly, it is possible to enhance the resolution when the detected light is spectroscopically separated. In addition, the light transmitted through each dichroic mirror is made incident substantially perpendicular to the band pass filter, so that the wavelength area of the light transmitted through the band pass filter can be prevented from being shifted.

It is preferable that the photodetector is a linear multi-anode type photomultiplier tube. Accordingly, the light of each wavelength range which is spectroscopically separated can be detected with high accuracy.

EFFECTS OF THE INVENTION

According to the present invention, occurrence of cross-talk can be suppressed when light beams having different wavelength ranges are optically received.

DESCRIPTION OF SYMBOLS

1: spectroscopic device, 2: photomultiplier tube (photodetector), 7: photoelectric surface (light-receiving face), 21: dichroic mirror array, 23: reflecting member, 23a: main mirror surface (reflection face), 24: band pass filter, $DM_n$: dichroic mirror, p: plane

BEST MODES FOR CARRYING OUT THE INVENTION

Preferred embodiments according to the present invention will be described hereinafter in detail with reference to the drawings. In the description of the drawings, the same or corresponding parts are represented by the same reference numerals, and overlapping description is omitted.

First Embodiment

Figure 1:
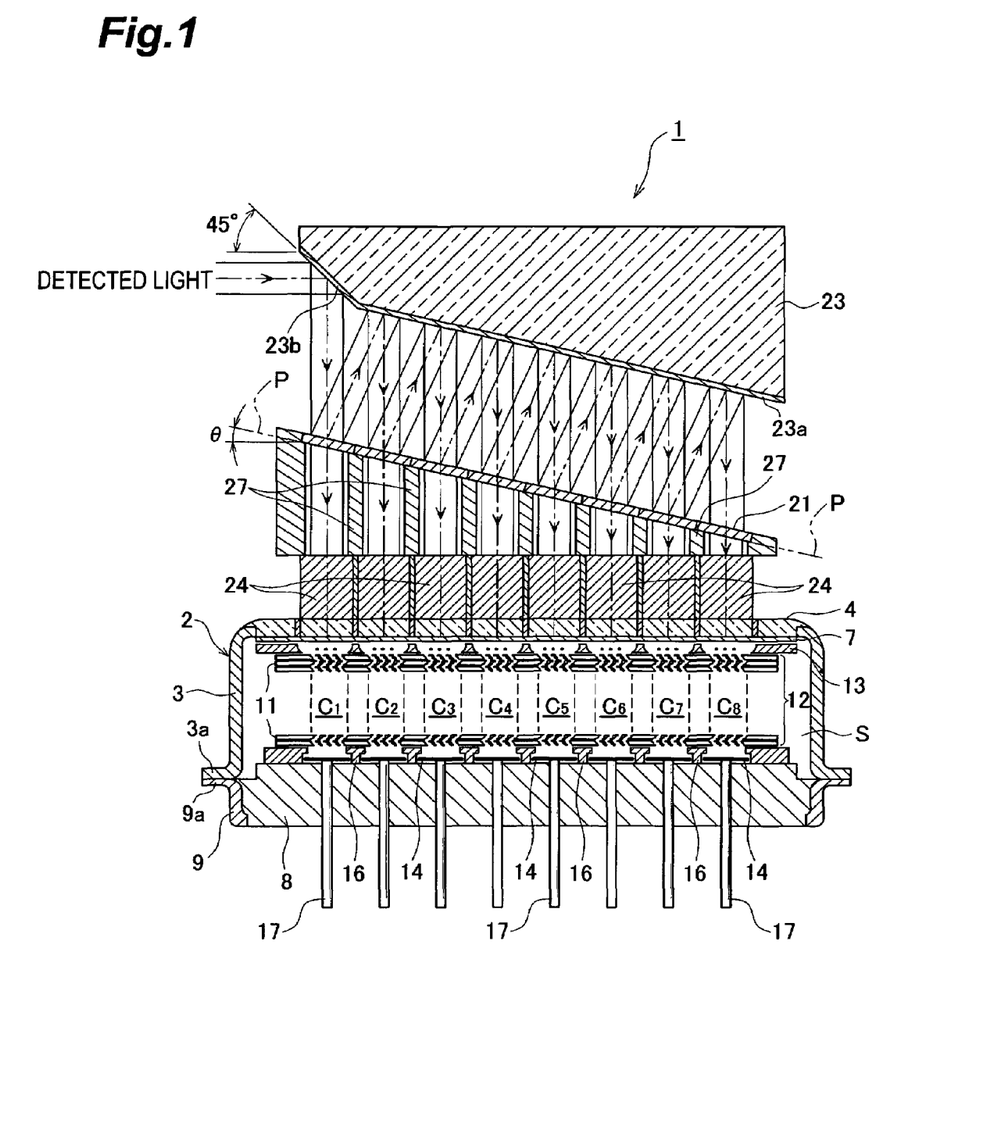
FIG. 1 is a cross-sectional view showing a first embodiment of a spectroscopic device according to the present invention.
Figure 2:
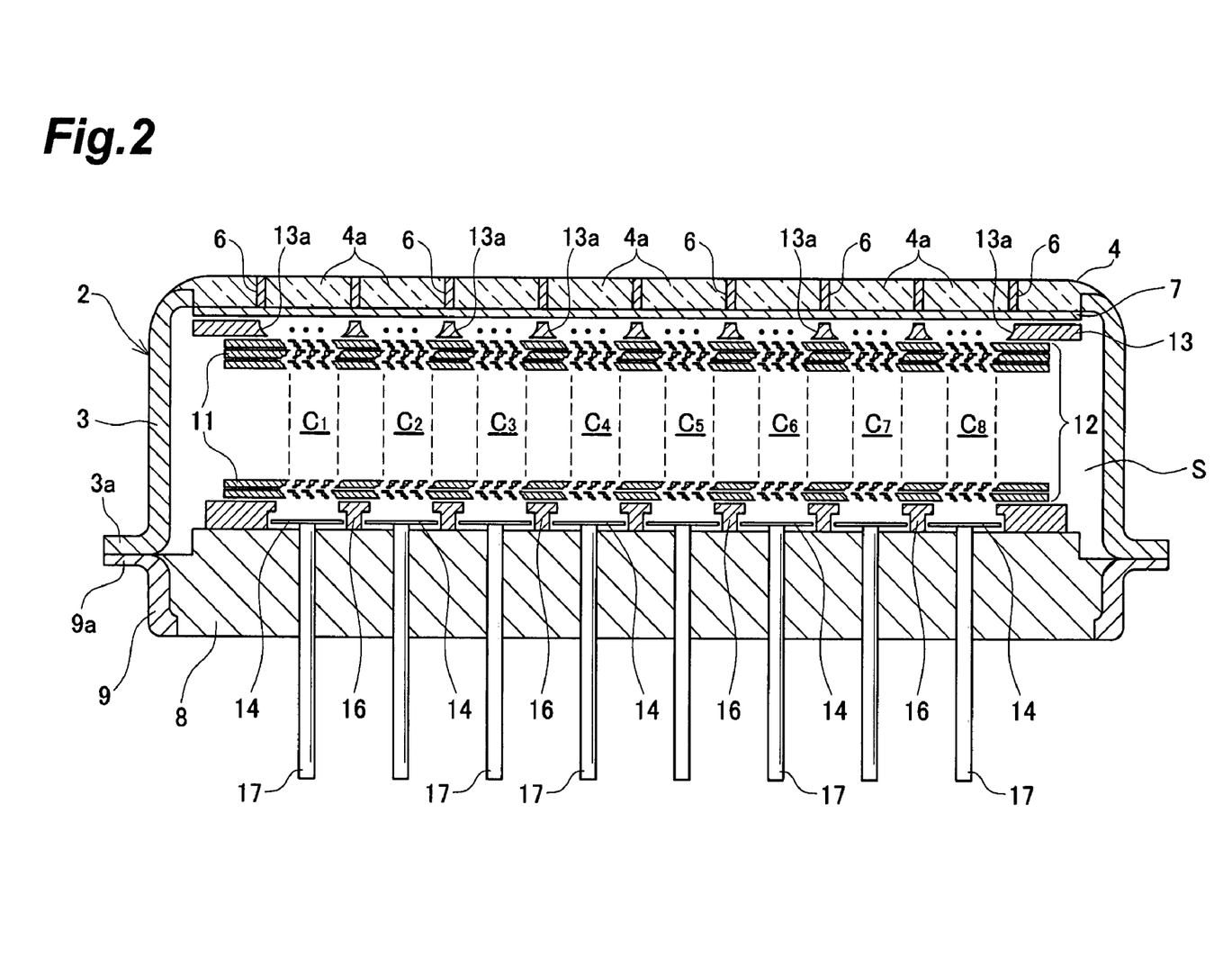
FIG. 2 is an enlarged cross-sectional view showing a photomultiplier tube of the spectroscopic device of FIG. 1.

As shown in FIG. 1 and FIG. 2, a spectroscopic device 1 is equipped with a linear multi-anode type photomultiplier tube (photodetector) 2. This photomultiplier tube 2 has a quadratic prism type metal side tube 3, and a rectangular light incident plate 4 formed of a light transmissible material such as glass is air-tightly fixed to the opening portion at one end side of the side tube 3 by fusion bonding or the like. The light incident plate 4 is partitioned at equal intervals by a plurality of light shielding plates 6 provided so as to extend in the perpendicular direction to the sheet surface (hereinafter referred to as "width direction") in FIG. 2, whereby a plurality of light incident portions 4a extending in the width direction are formed in the light incident plate 4. Furthermore, a photoelectric surface (light-receiving face) 7 is formed on the inner surface of the light incident plate 4.

A rectangular stem 8 formed of an insulating material such as glass is attached to the opening portion at the other end side of the side tube 3. More specifically, a metal surrounding member 9 for surrounding the side surface of the stem 8 is air-tightly fixed to the stem 8 by fusion bonding or the like, and a flange 9a formed at one end of the surrounding member 9 and a flange portion 3a formed at the other end of the side tube 3 are air-tightly joined to each other by resistance welding or the like.

As described above, a metal channel dynode 12 having multi-layered dynodes 11 is disposed in a vacuum space S formed by the side tube 3, the light incident plate 4, the stem 8, etc. Furthermore, a flat plate type converging electrode 13 is disposed between the metal channel dynode 12 and the photoelectric surface 7 in the vacuum space S. A plurality of slits 13a extending in the width direction are formed, and each slit 13a is opposed to each light incident portion 4a of the light incident plate 4 in the perpendicular direction to the photoelectric surface 7.

Furthermore, a plurality of multi-anodes 14 extending in the width direction are linearly arranged between the metal channel dynode 12 and the stem 8 in the vacuum space S, and each multi-anode 14 is opposed to each light incident portion 4a of the light incident plate 4 in the perpendicular direction to the photoelectric surface 7. A partition wall 16 for insulating the adjacent multi-anodes 14, 14 from each other is erectly provided on the inner surface of the stem 8, and the occurrence of cross-talk is suppressed. Furthermore, one end of a stem pin 17 for taking out an output signal is connected to each multi-anode 14, and the other end of each stem pin 17 air-tightly penetrates through the stem 8 and projects outwardly.

In the thus constructed photomultiplier tube 2, a plurality of channels $C_m$ (in this case, m=1 to 8) are formed by the electron passing holes of the metal channel dynode 12 and the slits 13a of the convergent electrode 13 located between the light incident portions 4a which are opposed to one another in the perpendicular direction of the photoelectric surface 7 and the multi-anodes 14. Accordingly, the photoelectric multiplier tube 1 has a plurality of linearly arranged channels $C_m$.

Here, the photoelectron multiplying action will be described by focusing on one channel $C_m$. When light transmitted through the light incident portion 4a is irradiated to the photoelectric surface 7, electrons in the photoelectric surface 7 are excited, and photoelectrons are discharged into the vacuum space S. The discharged photoelectrons are passed through the slit 13a of the convergent electrode 13 and converged to the dynode 11 at the foremost stage. Accordingly, the photoelectrons are multiplied by the metal channel dynode 12 while passing through the electron passage hole located between the light incident portion 4a and the multi-anode 14, and a secondary electron group is discharged from the dynode 12 at the last stage. This secondary electron group reaches the multi-anode 14 and an output signal is transmitted through the stem pin 17 connected to the multi-anode 14.

Figure 3:
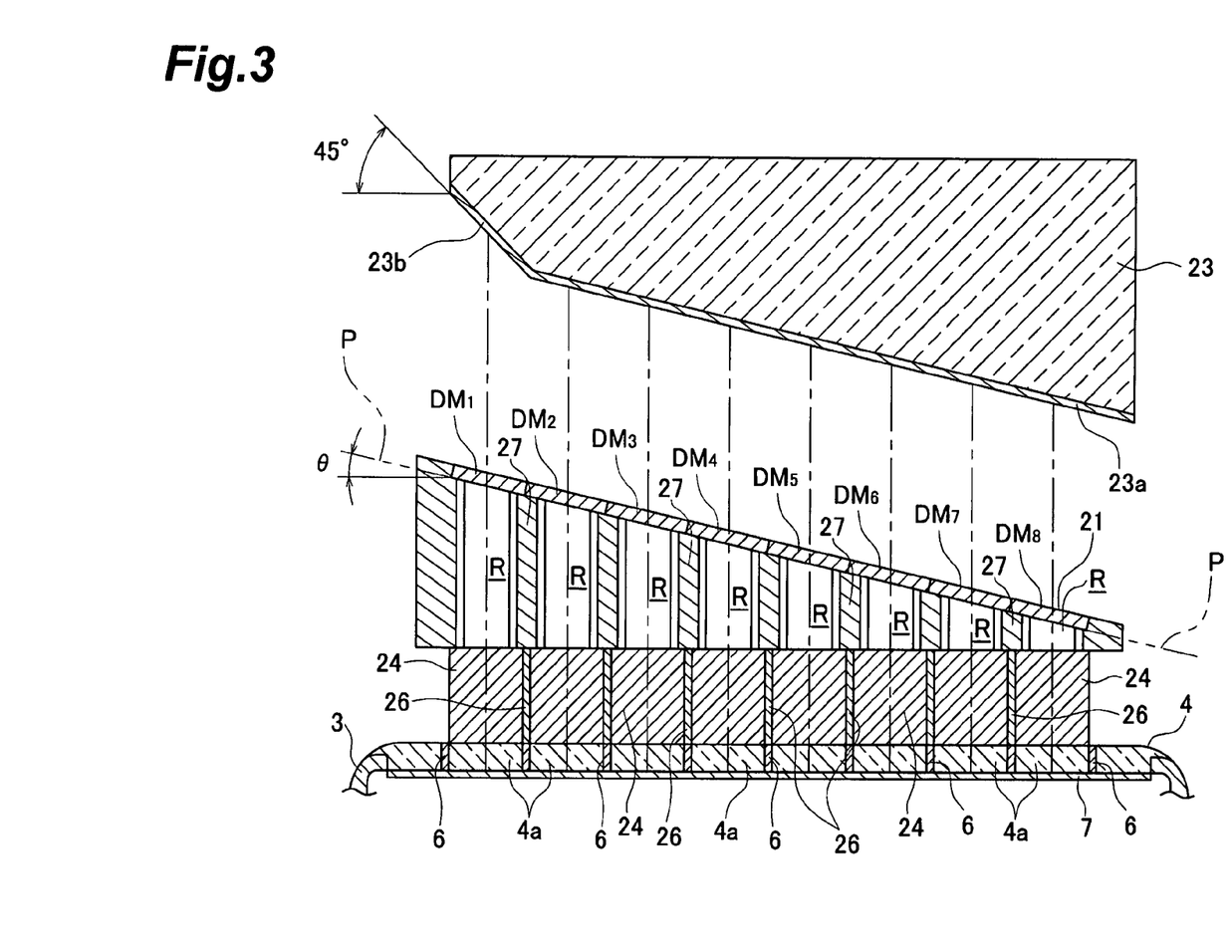
FIG. 3 is an enlarged cross-sectional view showing a dichroic mirror array peripheral portion of the spectroscopic device of FIG. 1.

As shown in FIG. 1 and FIG. 3, a dichroic mirror array 21 is disposed at the light incident side of the light incident plate 4 of the photomultiplier tube 2 so as to be inclined at a predetermined inclination angle θ (here, θ=12 degrees) along the arrangement direction of the light incident portions 4a. In the dichroic mirror array 21, a plurality of dichroic mirrors $DM_n$ (in this case, n=1 to 8) are arranged on a plane P which opposes the photoelectric surface 7 at an inclination angle θ to the photoelectric surface 7 along the inclination direction of the plane P. The long wavelength range side of each dichroic mirror is a light transmissible range, and the shortest wavelengths of the light transmissible ranges of the respective dichroic mirrors are different from one another. The dichroic mirrors are arranged in a decreasing order of the shortest wavelength along the inclination direction of the plane P. Each dichroic mirror $DM_n$ extends in the direction vertical to the sheet surface (hereinafter referred to as "width direction") in FIG. 3, and it opposes each light incident portion 4a in the perpendicular direction to the photoelectric surface 7. The distance between the dichroic mirror $DM_1$ having the maximum shortest wavelength and the photoelectric surface 7 is larger than the distance between the minimum shortest wavelength and the photoelectric surface 7.

Figure 4:
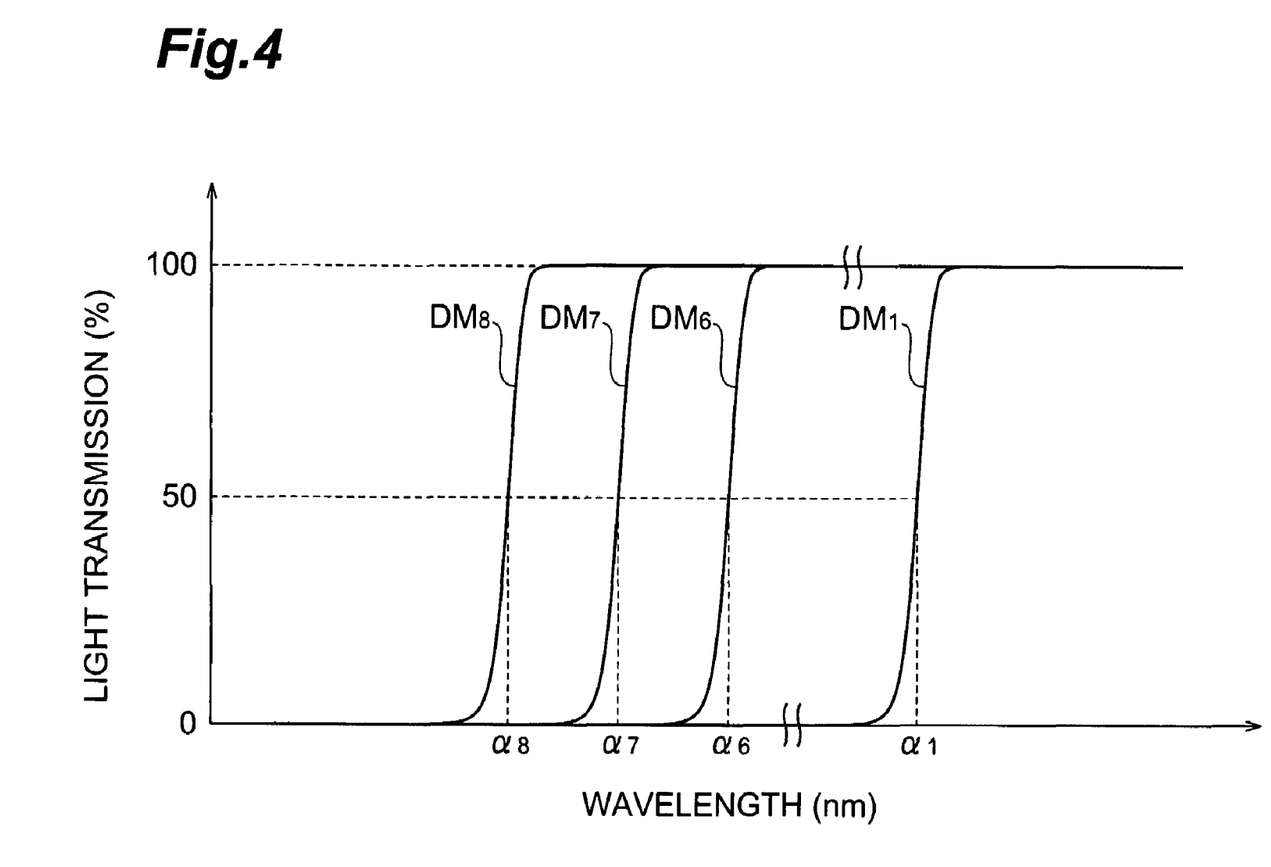
FIG. 4 is a graph showing the minimum wavelength of a light transmissible range when a long wavelength range side is a light transmissible range.

Here, the shortest wavelength of the light transmissible range when the long wavelength range side is a light transmissible range means the wavelength $\alpha_n$ when the light transmission in each dichroic mirror $DM_n$ is equal to 50% as shown in FIG. 4. It is assumed in the dichroic mirror array 21 that the shortest wavelength $\alpha_n$ of the light transmissible range is gradually increased in the order of the dichroic mirrors $DM_8, DM_7, DM_6, \ldots, DM_1$.

Furthermore, as shown in FIG. 1 and FIG. 3, a block type glass reflecting member 23 is disposed at the light reflection side of the dichroic mirror array 21. The reflection member 23 is provided with a main mirror surface (reflection face) 23a opposing the dichroic mirror array 21 substantially parallel to the dichroic mirror array 21, and a light guiding mirror surface 23b which is inclined at an angle of 45 degrees with respect to the photoelectric surface 7 and opposes the dichroic mirror $DM_1$ in the perpendicular direction of the photoelectric surface 7.

A band pass filter 24 extending in the width direction is disposed at the position corresponding to each dichroic mirror $DM_n$ in the perpendicular direction of the photoelectric surface 7 between the photoelectric surface 7 and the dichroic mirror array 21. Each band pass filter 24 is fixed to the outer surface of the light incident plate 4, and the adjacent band pass filters 24, 24 are partitioned by a light shielding plate 26 extending in the width direction. A light passage R is formed between the corresponding dichroic mirror $DM_n$ and band pass filter 24 in the perpendicular direction of the photoelectric surface 7, and the adjacent light passages R, R are partitioned by a light shielding member 27 extending in the width direction.

The spectroscopic action of the detected light in the thus constructed spectroscopic device 1 will be described. As shown in FIG. 1, the detected light which has been wave-shaped into collimated light is made incident to the light guiding mirror surface 23b of the reflecting member 23 parallel to the photoelectric surface 7 and along the arrangement direction of the light incident portion 4a. The light guiding mirror surface 23b is inclined at an angle of 45 degrees with respect to the photoelectric surface 7 and opposed the photoelectric surface 7 in the perpendicular direction of the photoelectric surface 7. Therefore, the detected light is reflected from the light guiding surface 23b so as to be bent by 90 degrees, and made incident to the dichroic mirror $DM_1$ along the perpendicular direction of the photoelectric surface 7. Therefore, the light transmitted through the dichroic mirror $DM_1$ (mainly, light of a longer wavelength range than the wavelength $\alpha_1$) is transmitted through the band pass filter 24 and the light incident portion 4a, and then made incident substantially perpendicular to the photoelectric surface 7.

On the other hand, the light reflected from the dichroic mirror $DM_1$ (mainly, light of a shorter wavelength range than the wavelength $\alpha_2$ reflected from the main mirror surface 23a of the reflecting member 23. At this time, the dichroic mirror array 21 is inclined so that the dichroic mirror $DM_8$ side having the minimum shortest wavelength is nearer to the photoelectric surface 7 than the dichroic mirror $DM_1$ side having the maximum shortest wavelength, and also it opposes the main mirror surface 23a substantially parallel to the main mirror surface 23a. Therefore, the light reflected from the main mirror surface 23a is made incident to the second largest shortest wavelength of the light transmissible range along the perpendicular direction of the photoelectric surface 7. Therefore, the light transmitted through the dichroic mirror $DM_2$ (mainly, light whose wavelength range is shorter than the wavelength $\alpha_1$ and longer than the wavelength $\alpha_2$) is also transmitted through the band pass filter 24 and the light incident portion 4a and made incident substantially perpendicular to the photoelectric surface 7.

As described above, the light reflection and transmission is repeated until the light reaches the dichroic mirror $DM_8$ having the minimum shortest wavelength of the light transmissible range, and all the light beams transmitted through the respective dichroic mirrors $DM_n$ (light beams which are different in wavelength range from one another) are transmitted through the band pass filter 24 and the light incident portion 4a and made incident substantially perpendicular to the photoelectric surface 7. Accordingly, occurrence of cross-talk in the photomultiplier tube 2 can be suppressed when light beams having different wavelength ranges are optically received, so that the output signal of each channel $C_m$ can be taken out with high accuracy.

Figure 5:
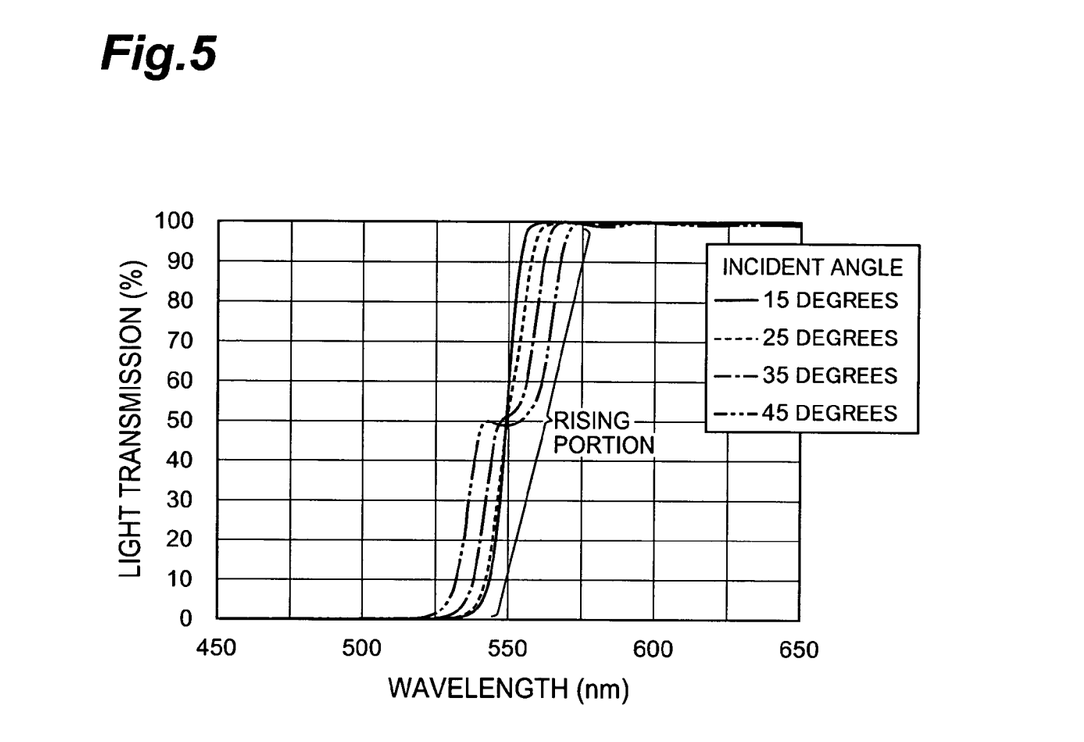
FIG. 5 is a graph showing an example of a light transmission characteristic of every incident angle in the dichroic mirror.

It is common that light is made incident to the dichroic mirror at an incident angle of 45 degrees. However, when the incident angle is gradually reduced from 45 degrees, the rising portion, of the light transmission characteristic is sharper and becomes linear as shown in FIG. 5. This means that as the incident angle of light to the dichroic mirror is reduced, the wavelength discrimination is further enhanced. In the above-described spectroscopic device 1, each dichroic mirror $DM_n$ is disposed on the plane P which is inclined at an inclination angle θ of 12 degrees with respect to the photoelectric surface 7, and light is made incident to each dichroic mirror $DM_n$ along the perpendicular direction of the photoelectric surface 7, so that the incident angle of the light to each dichroic mirror $DM_n$ is equal to 12 degrees. Accordingly, the spectroscopic device 1 has high wavelength discrimination of each dichroic mirror $DM_n$. From this point of view, it is preferable that the inclination angle θ is equal to 15 degrees or less. By arranging the dichroic mirrors $DM_n$ on the plane P which is inclined at the inclination angle θ of 12 degrees with respect to the photoelectric surface 7, the spectroscopic device 1 can be further miniaturized as compared with a spectroscopic device in which each dichroic mirror $DM_n$ is disposed to be inclined at 45 degrees with respect to the photoelectric surface 7.

As described above, the light transmitted through each diachronic mirror $DM_n$ is passed through the band pass filter 24, and thus the wavelength discrimination can be further enhanced. Accordingly, the resolution when the detected light is spectroscopically separated can be enhanced. In addition, the light transmitted through each dichroic mirror $DM_n$ is made incident substantially perpendicular to the band pass filter 24, so on the wavelength range of the light transmitted through the band pass filter 24 can be prevented from being shifted.

Second Embodiment

A spectroscopic device 1 according to a second embodiment is different from the spectroscopic device 1 of the first embodiment in the constructions of the dichroic mirror array 21 and the reflecting member 23. Accordingly, the constructions of the dichroic mirror array 21 and the reflecting member 23 will be mainly described, and description of other constructions will be omitted.

Figure 6:
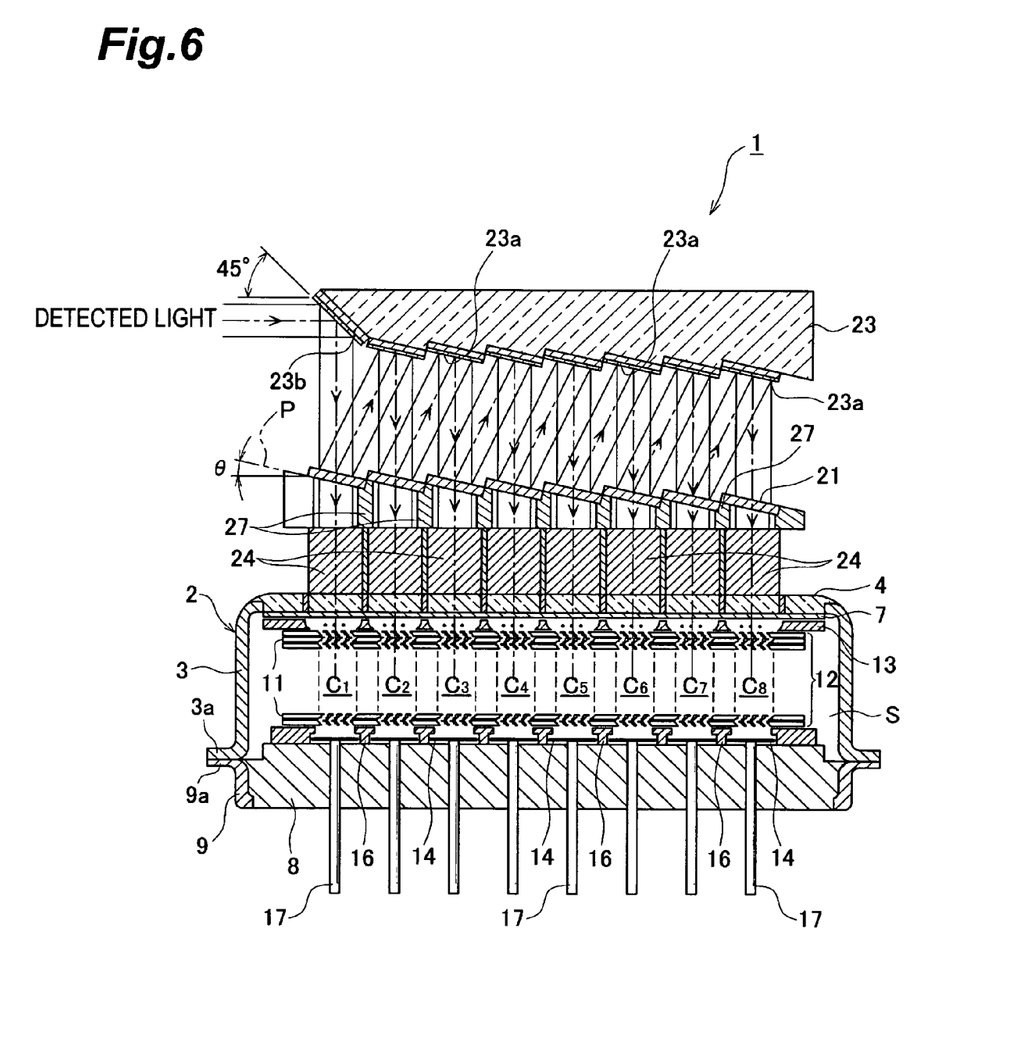
FIG. 6 is a cross-sectional view showing a second embodiment of the spectroscopic device according to the present invention.
Figure 7:
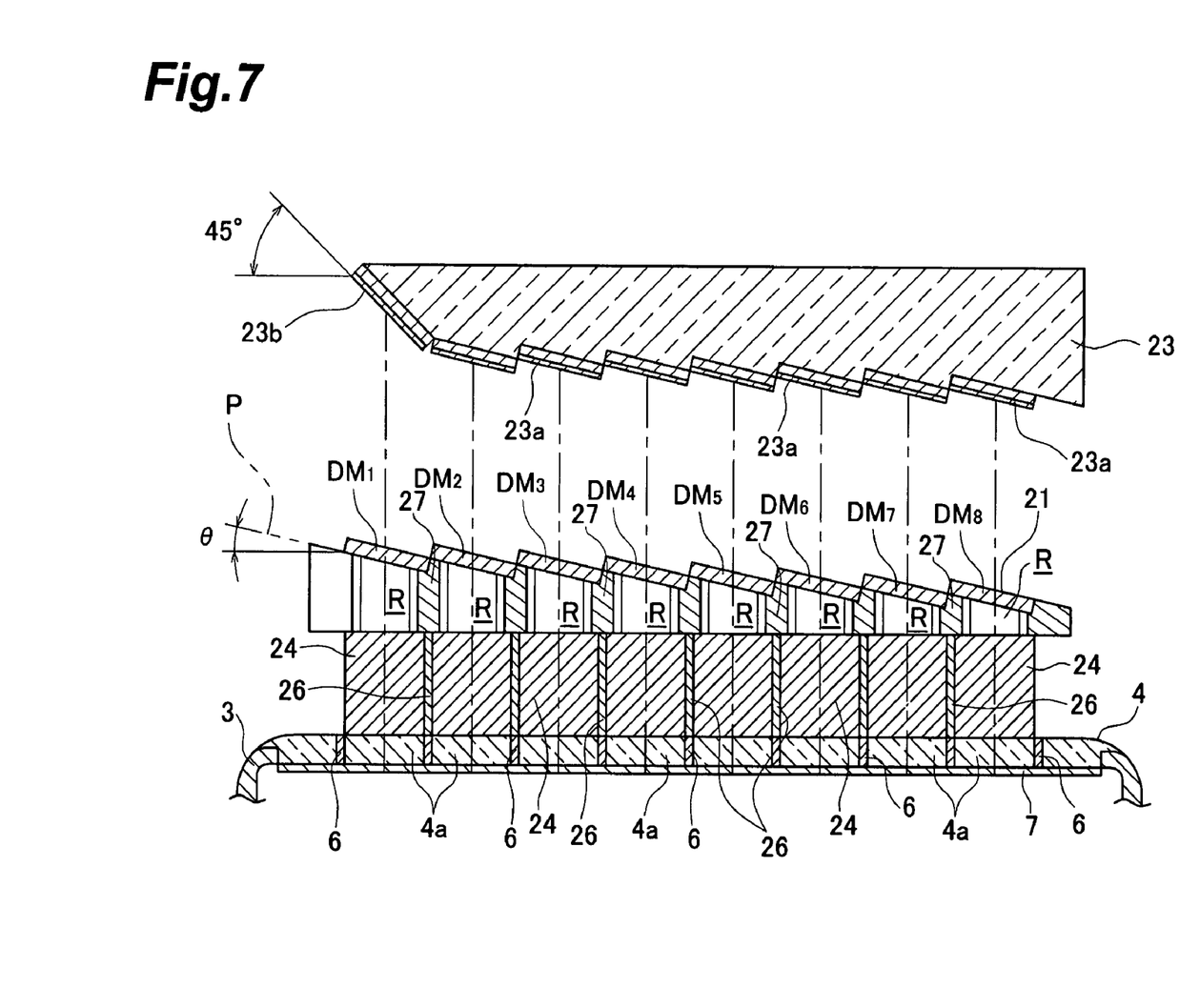
FIG. 7 is an enlarged cross-sectional view showing a dichroic mirror array peripheral portion of the spectroscopic device of FIG. 6.

As shown in FIG. 6 and FIG. 7, the spectroscopic device 1 has a dichroic mirror array 21 disposed at the light incident side of the light incident plate 4 of the photomultiplier tube 2. In the dichroic mirror array 21, a plurality of dichroic mirrors $DM_n$ (in this case, n=1 to 8) whose long wavelength range sides are light transmissible ranges and which have the shortest wavelengths of the light transmissible ranges different from one another are arranged along an inclination direction of a plane P opposing the photoelectric surface 7 at an inclination angle θ (in this case, θ=12 degrees) to the photoelectric surface 7 in a decreasing order of the shortest wavelength so as to be substantially parallel to the plane P. Each dichroic mirror $DM_n$ extends in the perpendicular direction to the sheet surface (hereinafter referred to as "width direction"), and opposes each light incident portion 4a in the perpendicular direction of the photoelectric surface 7. The plane P is inclined so that the dichroic mirror $DM_8$ having, the minimum shortest wavelength is nearer to the photoelectric surface as compared with the dichronic mirror $DM_1$ such having the maximum shortest wavelength.

A block-shaped glass reflecting member 23 is disposed at the light reflection side of the dichroic mirror array 21. The reflection member 23 is provided with a main mirror surface (reflection face) 23a opposing each dichroic mirror $DM_n$ substantially parallel, and a light guiding mirror surface 23b which is inclined at an angle of 45 degrees with respect to the photoelectric surface 7 and opposes the dichroic mirror $DM_1$ in the perpendicular direction of the photoelectric surface 7.

As described above, the spectroscopic action of the detected light in the spectroscopic device 1 of the second embodiment that is constructed by the dichroic mirror array 21 and the reflecting member 23 as described above will be described. As shown in FIG. 6, the detected light which has been wave-shaped into collimated light is made incident to the light guiding mirror surface 23b of the reflecting member 23 parallel to the photoelectric surface 7 and along the arrangement direction of the light incident portion 4a. The light guiding mirror surface 23b is inclined at an angle of 45 degrees with respect to the photoelectric surface 7 and also opposes the dichroic mirror $DM_1$ in the perpendicular direction of the photoelectric surface 7. Therefore, the detected light is reflected by the light guiding surface 23b so as to be bent by 90 degrees, and made incident to the dichroic mirror $DM_1$ along the perpendicular direction of the photoelectric surface 7. Therefore, the light transmitted through the dichroic mirror $DM_1$ (mainly, light of a longer wavelength range than the wavelength $α_1$) is transmitted through the band pass filter 24 and the light incident portion 4a and made incident substantially perpendicular to the photoelectric surface 7.

On the other hand, the light reflected from the dichroic mirror $DM_1$ (mainly, light of a shorter wavelength range than the wavelength $α_1$) is reflected from the main mirror surface 23a opposing the dichroic mirror $DM_1$ in the reflecting member 23. At this time, each dichroic mirror $DM_n$ is disposed substantially parallel to the plane P which is inclined so that the dichroic mirror $DM_8$ side having the minimum shortest wavelength is nearer to the light-receiving face than the dichroic mirror $DM_1$ side having the maximum shortest wavelength, and also it opposes each main mirror surface 23a of the reflecting member 23 substantially parallel. Therefore, the light reflected from the main mirror surface 23a is made incident to the dichroic mirror $DM_2$ having the second largest shortest wavelength of the light transmissible range along the perpendicular direction of the photoelectric surface 7. Therefore, the light transmitted through the dichroic mirror $DM_2$ (mainly, light whose wavelength range is shorter than the wavelength $α_1$ and also longer than the wavelength $α_2$) is also transmitted through the band pass filter 24 and the light incident portion 4a and made incident substantially perpendicular to the photoelectric surface 7.

As described above, the light reflection and transmission is repeated until the light reaches the dichroic mirror $DM_8$ having the minimum shortest wavelength of the light transmissible range, and all the light beams transmitted through each dichroic mirror $DM_n$ (light beams which are different in wavelength range from one another) are transmitted through the band pass filter 24 and the light incident portion 4a and made incident substantially perpendicular to the photoelectric surface 7. Accordingly, when the light beams of different wavelength ranges are optically received, occurrence of cross-talk in the photomultiplier tube 2 can be suppressed, and the output signal of each channel $C_m$ can be taken out with high accuracy.

In the spectroscopic device 1 of the second embodiment, the distance between each dichroic mirror $DM_n$ and the photoelectric surface 7 is shorter than that in the spectroscopic device 1 of the first embodiment, and thus the optical path length of light transmitted through each dichroic mirror $DM_n$ is shorter. Accordingly, as compared with the spectroscopic device 1 of the first embodiment, the light scattering between each dichroic mirror $DM_n$ and the photoelectric surface 7 can be suppressed, and a reduction in cross-talk can be further promoted. In addition, as compared with the spectroscopic device 1 of the first embodiment, the distance between each dichroic mirror $DM_n$ and the photoelectric surface 7 is shorter, and thus the miniaturization of the spectroscopic device 1 can be further promoted.

The present invention is not limited to the above embodiments.

For example, in the dichroic mirror array 21, a plurality of dichroic mirrors $DM_n$ whose short wavelength range side is the light transmissible range and whose longest wavelengths of the light transmissible ranges are different from one another may be arranged in an increasing order of the longest wavelength on a plane P which is inclined at an inclination angle θ with respect to the photoelectric surface 7 and opposes the photoelectric surface 7. In this case, the distance between the dichroic mirror $DM_1$ having the minimum longest wavelength and the photoelectric surface 7 is set to be larger than the distance between the dichroic mirror $DM_8$ having the maximum shortest wavelength and the photoelectric surface 7.

Figure 8:
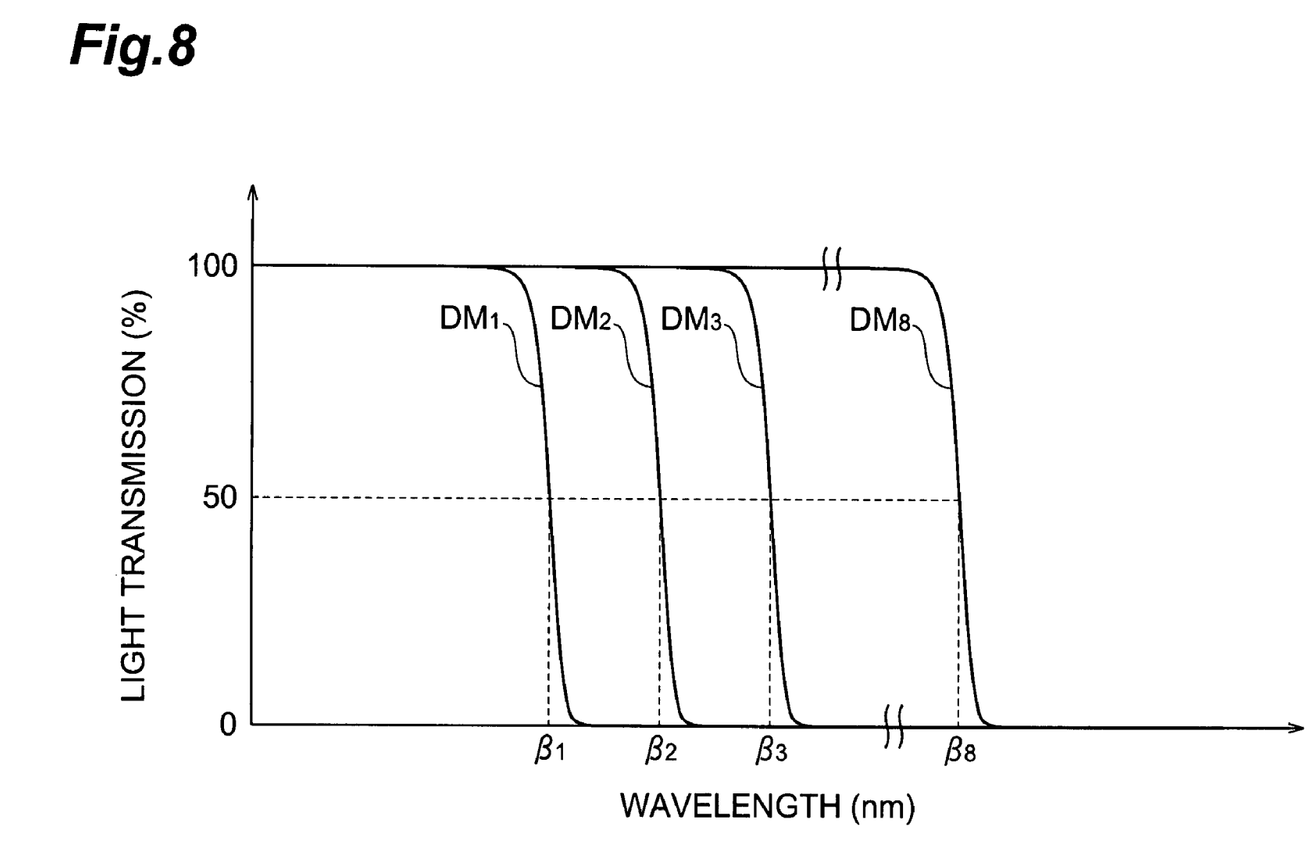
FIG. 8 is a graph showing the maximum wavelength of the light transmissible range when a short wavelength range side is a light transmissible range.

Here, the longest wavelength of the light transmissible range when the short wavelength range side is a light transmissible range means the wavelength $β_n$ when the light transmission in each dichroic mirror $DM_n$ is equal to 50%. In this case, in the dichroic mirror array 21, the longest wavelength $β_n$ of the light transmissible range is gradually increased in the order of the dichroic mirror $DM_1, DM_2, DM_3, \ldots, DM_8$.

As described above, in the point that the dichroic mirror $DM_n$ whose short wavelength range side is a light transmissible range is used, the spectroscopic device 1 of this case is different from the spectroscopic device 1 of the above embodiment using the dichroic mirror $DM_n$ whose long wavelength range side is a light transmissible range. Accordingly, in the spectroscopic device 1 of this case, a plurality of dichroic mirrors $DM_n$ whose long wavelengths of the light transmissible ranges are different from one another are arranged in an increasing order of the longest wavelength, whereby the occurrence of cross-talk in the photomultiplier tube 2 can be suppressed when light beams of different wavelength ranges are optically received as in the case of the spectroscopic device 1 of the above embodiment.

Furthermore, in the above embodiment, the linear multi-anode type photomultiplier tube 2 is used as the photodetector in order to detect each spectroscopically separated wavelength range light with high accuracy, however, a photodiode array, a linear CCD or the like may be used as the photodetector.

INDUSTRIAL APPLICABILITY

As described above, according to the present invention, when light beams of different wavelength ranges are optically received, occurrence of cross-talk can be suppressed.

The invention claimed is:

1. A spectroscopic device for spectroscopically separating detected light into light beams having different wavelength ranges and optically receiving light of each wavelength range by a light-receiving face of a photodetector comprising:
   a dichroic mirror array having a plurality of dichroic mirrors, each of the dichroic mirrors having a long wavelength range side that comprises a light transmissible range of wavelengths and the shortest wavelengths of the light transmissible ranges of the respective dichroic mirrors are different from each other, and that are arranged along an oblique direction of a plane opposing a light-receiving face at a predetermined inclination angle to the light-receiving face in a decreasing order of the shortest wavelength so as to be substantially parallel to the plane; and
   a reflection member that is disposed at the light reflection side of the dichroic mirror array and equipped with a reflection face opposing the dichroic mirrors substantially parallel to the dichroic mirrors, wherein
   the plane is inclined so that the dichroic mirror side having the minimum shortest wavelength is nearer to the light-receiving face than the dichroic mirror side having the maximum shortest wavelength,
   the detected light is made incident to the dichroic mirror having the maximum shortest wavelength along the perpendicular direction of the light-receiving face.

2. A spectroscopic device for spectroscopically separating detected light into light beams having different wavelength ranges and optically receiving light of each wavelength range by a light-receiving face of a photodetector, comprising:
   a dichroic mirror array having a plurality of dichroic mirrors, each of the dichroic mirrors having a short wavelength range side that comprises a light transmissible range of wavelengths and the longest wavelengths of the light transmissible ranges of the respective dichroic mirrors are different from each other, and that are arranged along an oblique direction of a plane opposing a light-receiving face at a predetermined inclination angle to the light-receiving face in an increasing order of the longest wavelength so as to be substantially parallel to the plane; and
   a reflection member that is disposed at the light reflection side of the dichroic mirror array and equipped with a reflection face opposing the dichroic mirrors substantially parallel to the dichroic mirrors, wherein
   the plane is inclined so that the dichroic mirror side having the maximum longest wavelength is nearer to the light-receiving face than the dichroic mirror side having the minimum longest wavelength,
   the detected light is made incident to the dichroic mirror having the minimum longest wavelength along the perpendicular direction of the light-receiving face.

3. The spectroscopic device according to claim 1, wherein a band pass filter is disposed at the position corresponding to each of the dichroic mirrors in the perpendicular direction of the photoelectric surface between the photoelectric surface and the dichroic mirror array.

4. The spectroscopic device according to claim 1, wherein the photodetector is a linear multi-anode type photomultiplier tube.

5. The spectroscopic device according to claim 2, wherein a band pass filter is disposed at the position corresponding to each of the dichroic mirrors in the perpendicular direction of the photoelectric surface between the photoelectric surface and the dichroic minor array.

6. The spectroscopic device according to claim 2, wherein the photodetector is a linear multi-anode type photomultiplier tube.

* * * * *